(No Model.)
T. A. EDISON.
ELECTRICAL TRANSMISSION OF POWER.
No. 370,128. Patented Sept. 20, 1887.
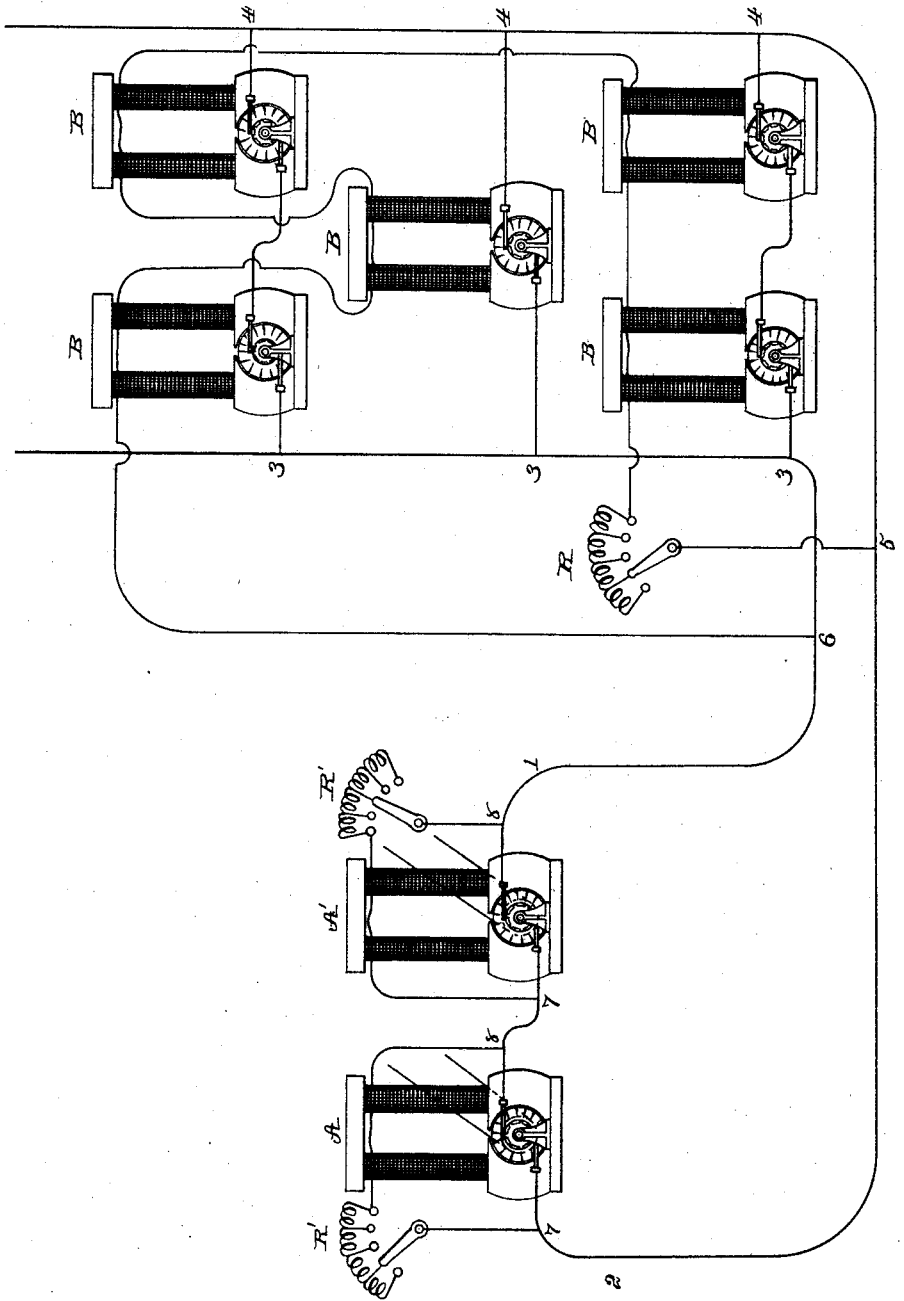
ATTEST:  
E. C. Rowland  
H. W. Seely
INVENTOR:  
Thomas A. Edison,  
By Rich'd N. Dyer,  
Atty.

UNITED STATES PATENT OFFICE.

THOMAS A. EDISON, OF MENLO PARK, NEW JERSEY.

ELECTRICAL TRANSMISSION OF POWER.

SPECIFICATION forming part of Letters Patent No. 370,128, dated September 20, 1887.

Application filed June 7, 1883. Serial No. 97,328. (No model.)

*To all whom it may concern:*

Be it known that I, THOMAS A. EDISON, of Menlo Park, in the county of Middlesex and State of New Jersey, have invented a new and useful Improvement in Electrical Transmission of Power, (Case No. 570,) of which the following is a specification.

The object of this invention is to so arrange a number of independent electro-dynamic motors supplied from the same source of energy (that is, separate motors not attached to the same driving-shaft, as in my Patent No. 248,435,) that they may be controlled or regulated simultaneously, while they can be put in or removed from operation without affecting one another.

A further object is to cause the field-magnets of the motors when their armatures are on a high-tension line to be energized by a current of low tension.

In carrying out the invention, the source of energy may consist of any desired number of generators—preferably dynamo-electric machines. Such machines may be arranged in any suitable manner. Preferably they are placed in series, with their field-coils in shunts from the main line; or the field-coils could all be included in a single shunt around one or more or all of the machines. An adjustable resistance is placed in the field-circuit of each machine, or in the shunt including all the fields, whereby the generation of current is regulated according to the requirements of the motors supplied by the generators. The main conductors extend from the series of generators to the locality in which the electro-dynamic motors are situated. Such motors are placed in multiple arc or multiple series across the main conductors—that is, cross-circuits are provided, each of which may contain one, two, or any desired number of motors. The fields of all the motors are placed in series in a multiple-arc circuit across the main conductors or in a shunt-circuit from one of them. An adjustable resistance or other means for regulating the current in the circuit which includes the fields is provided. By thus connecting all the fields in series, instead of connecting them separately across the line, the fields receive a lower tension-current, and they may therefore be wound with coarse wire, and the danger to the coils which arises with high-tension currents is avoided.

Each multiple-arc circuit, containing one or more motors, may, it is evident, be connected with or disconnected from the main conductors, so as to throw in or out of operation the motor or motors contained in such circuit, without affecting the motors in the other multiple-arc circuits of the system.

The generators which supply current to the system of motors are regulated as motors are thrown into or removed from operation, so that the proper current may always be supplied. The adjustable resistance in the field-circuit of all the motors is regulated to vary the speed of such motors.

My invention is illustrated diagrammatically in the annexed drawing.

A A' are dynamo-electric machines arranged in series, so as to produce a current of high tension or electro-motive force. The main conductors 1 2 extend from the series of generators, of which there may be any desired number, two only being shown for illustration. Multiple-arc or derived circuits 3 4 extend across the main conductors. Each of such circuits includes the armatures of one or more of the electro-dynamic motors B. The field-coils of all these motors are in the multiple-arc circuit 5 6, which contains also the adjustable resistance R, by adjusting which the current in the fields, and consequently the speed of all the motors, is regulated. The field-coils of each generator are in a shunt-circuit, 7 8, and each shunt-circuit contains an adjustable resistance, R'.

The uses of the resistances R and R' have been previously explained.

What I claim is—

1. The combination, with one or more dynamo or magneto electric machines, of main conductors extending therefrom, multiple-arc circuits extending across said main conductors, each containing one or more electro-dynamic motors, all such motors being mechanically independent of each other, a circuit including the field-magnets of all said motors, and means for regulating the current in said field-magnet circuit, substantially as set forth.

2. The combination, with two or more dynamo or magneto electric machines, means for regulating the generation of current thereby, and main conductors extending therefrom, of two or more mechanically-independent electro-dynamic motors connected in multiple arc or multiple series across said main conductors, a circuit including the field-magnets of all said motors, and means for regulating the current in said circuit, substantially as set forth.

This specification signed and witnessed this 1st day of June, 1883.

THOS. A. EDISON.

Witnesses:
H. W. SEELY,
EDWARD H. PYATT.